(12) United States Patent
Novak et al.

(10) Patent No.: US 7,107,296 B2
(45) Date of Patent: Sep. 12, 2006

(54) MEDIA LIBRARY SYNCHRONIZER

(75) Inventors: Michael John Novak, Redmond, WA (US); Daniel Plastina, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 490 days.

(21) Appl. No.: 10/606,345

(22) Filed: Jun. 25, 2003

(65) Prior Publication Data

US 2004/0267825 A1    Dec. 30, 2004

(51) Int. Cl.
*G06F 17/30*    (2006.01)
(52) U.S. Cl. .................. 707/203; 707/10; 707/100
(58) Field of Classification Search .............. 707/4, 707/104.1, 200, 100, 23, 203
See application file for complete search history.

(56) References Cited

U.S. PATENT DOCUMENTS

| 6,321,219 | B1 | 11/2001 | Gainer et al. |
| 6,389,433 | B1 | 5/2002 | Bolosky et al. |
| 6,449,615 | B1 | 9/2002 | Liu et al. |
| 6,496,944 | B1 | 12/2002 | Hsiao et al. |
| 6,631,369 | B1 * | 10/2003 | Meyerzon et al. ............. 707/4 |

* cited by examiner

*Primary Examiner*—Mohammad Ali
*Assistant Examiner*—Leon J. Harper
(74) *Attorney, Agent, or Firm*—Lee & Hayes, PLLC (57) ABSTRACT

A system and method is disclosed for selectively synchronizing, with a media library, media files within folders of a filing system. This system and method can preferentially synchronize certain folders rather than others based on whether or not the folders have been modified. This system and method can also maintain synchronization between a media library and a filing system by regularly checking for changes in the filing system.

5 Claims, 8 Drawing Sheets

MEDIA LIBRARY SYNCHRONIZER

TECHNICAL FIELD

This invention relates to a system and method for selectively synchronizing media files with a media library.

BACKGROUND

Computer users often store music, movies, and other media files on their computers. By so doing, users can later play and record their music without having to get another copy. But filing systems in many computers are not geared to allow users to easily view and use their media files.

To correct this, media libraries were created. A media library typically allows a user to graphically view his or her media files that are stored on his or her computer. These media libraries provide a different, more user-friendly way to view media files than most computer filing systems. Instead of showing media files like other data and programming files, they can be arranged by artist, genre, album, common title, and the like. They are also often shown with additional options from a related media player, like options to play the media file or add it to a CD that a user is burning.

Figure 1:
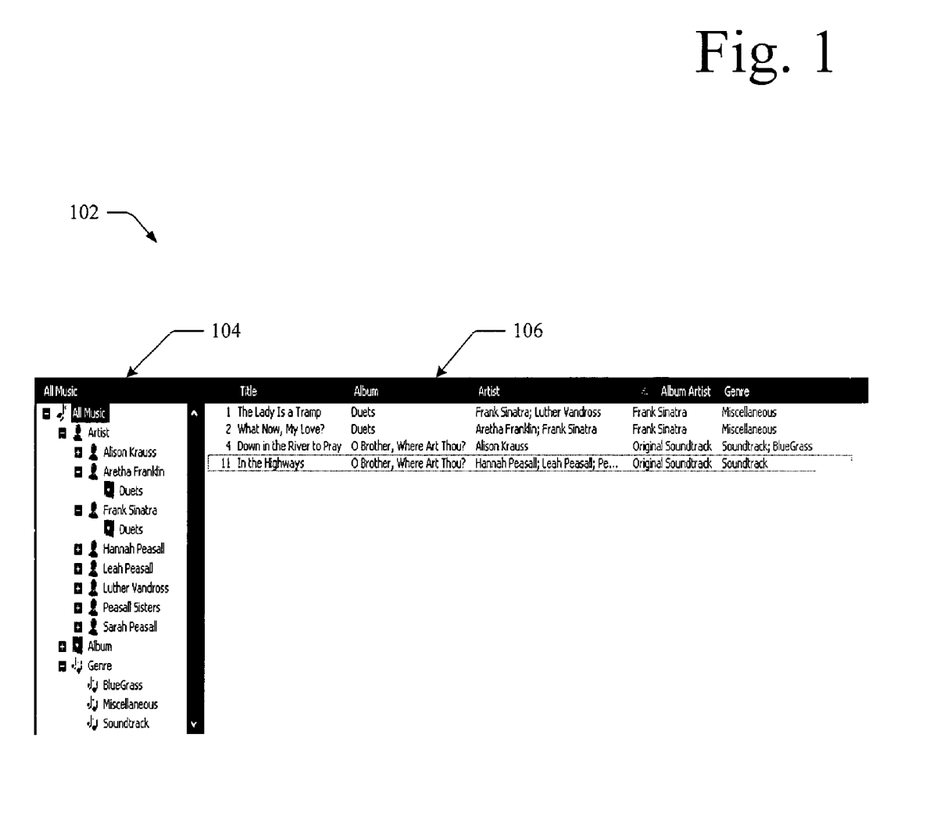
FIG. 1 illustrates an exemplary user interface for a media library.

FIG. 1 shows an exemplary user interface 102 of a media library. This user interface 102 shows how media files can be arranged to make it easier for users to analyze, view, and use their media files. A media table 104 shows a way in which media files can be arranged based on information about the content of the media files. Here, the media files are arranged using information about each media file's artist, album, and genre. Likewise, a media file description space 106 shows information about particular media files. This information is additional to information about a media file's location, and is often included in media libraries but is not typically present when viewing media files in a computer filing system.

Thus, one of the goals of a typical media library is to show and arrange media files based on information about the content of these media files. This aspect of media libraries can be more useful to users than other ways of arranging media files, such as with a typical computer filing system. Typical computer filing systems arrange media files based on each media file's location, not its content. Users, however, often prefer that their media files be organized and shown by their content, not their location. This is one advantage of media libraries.

There are significant problems with current media libraries, however. To use a media library, often users have to manually add, delete, and change links in the media library whenever the user adds, deletes, or moves a media file stored on his or her computer.

This manual building and maintaining what is in a media library is often annoying to even sophisticated users. To unsophisticated users, this manual building can be difficult and time-consuming.

In some cases, media library manufacturers partially address these problems by having a media player automatically add and delete links from a media library when a user opens their media player. These methods do so by synchronizing files in a user's hard-drive with the media library.

This partial solution, however, contains serious flaws. This synchronization method can take an extraordinary quantity of time to perform. Many users, when asked by a media player using this synchronization method to synchronize their media library with their harddrive, refuse to allow the operation because of how long it can take.

This synchronization method is not only slow, it is incapable of performing many important functions. It is incapable of properly accounting for media files being moved within a user's filing system, for instance. It is also incapable of knowing when not to add a link to a media library, instead adding links to media files in the user's computer that the user does not want in the user's media library.

Current synchronization methods fail to quickly and intelligently synchronize a user's media library with media files stored in the user's computer.

SUMMARY

The following description and figures describe a system and method for synchronizing a media library with media files in a filing system. This system and method can maintain a synchronization between a media library and a filing system, including by regularly checking for changes in the filing system. Also, in some cases this system and method can avoid automatically adding links to a media library for media files that a user has previously removed from the media library. Further, in some cases this system and method can repair links in a media library to media files that have been moved.

BRIEF DESCRIPTION OF THE DRAWINGS

The same numbers are used throughout the disclosure and figures to reference like components and features.

DETAILED DESCRIPTION

The following disclosure describes a media library synchronizer. This media library synchronizer and its related methods enable a user to add, delete, and move media files within the user's filing system without also having to add, delete, or move links to these media files within the user's media library. A user can make a change to his or her computer's memory and automatically the synchronizer can fix the user's media library to reflect this change.

The synchronizer and its related methods can often synchronize additions and deletions of media files more quickly than current synchronizers. Rather than scan possibly thousands of files in dozens of folders to assess whether or not any new files have been added or deleted from the folders, this synchronizer and its related methods can scan just contents of folders that have been modified. By so doing, this synchronizer and its related methods enable potentially dramatic reductions in time and resources needed to synchronize folders with a media library.

Further, this synchronizer is capable of periodically updating a media library without interaction from a user. This periodic updating can be performed at particular times or when prompted by a change made by a user, such as by the user adding a media file to his or her computer's memory.

This new synchronizer and its related methods can also prioritize between changes made by a user that were preformed some time previously or those just made by the user. By so doing, the synchronizer and its related methods can more quickly alter a media library to reflect a change just made. Many users desire this currently unavailable feature because they want, as soon as possible, to play and see in their media library a media file that they just added.

Exemplary System

Overview

Figure 2:
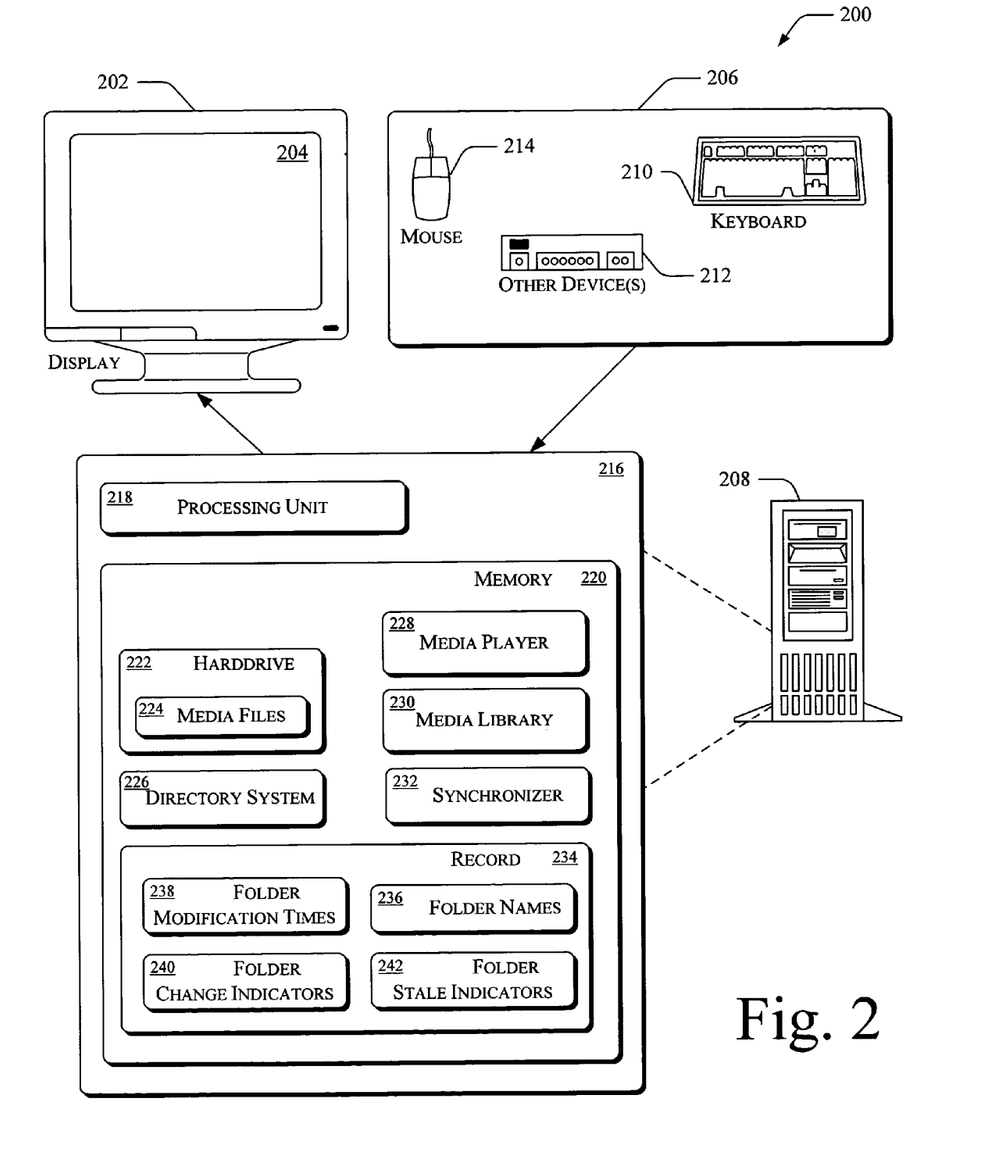
FIG. 2 illustrates a computer system for a media library synchronizer.

FIG. 2 shows an exemplary system 200 usable to create a media library synchronizer. The system 200 includes a display 202 having a screen 204, a user-input device 206, and a computer 208. The user-input device 206 can include any device allowing a computer to receive input from a user, such as a keyboard 210, other devices 212, and a mouse 214. The other devices 212 can include a touch screen, a voice-activated input device, a track ball, and the like. The user can send input via the user-input device 206 to the computer 208 to add a media file to a folder to the computer 208, for instance. The user can use the display 202 and its screen 204 to view user interfaces, including the user interface 102 of the media library of FIG. 1.

The computer 208 includes components shown in block 216, such as a processing unit 218 to execute applications and a memory 220 containing various applications and files. The memory 220 includes volatile and non-volatile memory, the non-volatile memory including a harddrive 222.

The harddrive 222 includes media files 224. These media files 224 are arranged into folders with and as part of a directory system 226 of the computer 208. This directory system 226 is a type of filing system. It organizes the media files 224 into folders (including subfolders, sub-subfolders and so forth), which allows the computer 208 and its users to organize files into a hierarchical structure. The directory system 226 can contain many different folders, some of which may contain one or more of the media files 224 or subfolders containing one or more of the media files 224. The directory system 226 can organize into folders files that are stored on the harddrive 222 or otherwise, including those accessible from a remote source (such as across a communications network).

For purposes of clarity in explaining the methods described below, the following disclosure refers to the harddrive 222 to encompass many different memory types and their locations. The harddrive 222 can include folders and files stored remotely, including those accessible through a intranet, global internet, or other communication network. It can also include multiple local devices, such as additional computer harddrives, other memory devices, and the like.

The memory also includes applications and files, including the directory system 226, a media player 228, a media library 230, a media library synchronizer 232, and a record 234.

The media player 228 interacts with the media library 230 in various ways. In one implementation, the media library 230 is included within the media player 228. These two applications can work together to enable a user to easily use the media library 230, such as by including a user interface for the media library 230 within the media player 228. Also, the media library 230 and the media player 228 can be interrelated to allow a user to select media files presented by the media library 230 for play, recording, downloading, and the like by the media player 228. The media player 228 and the media library 230 can also be separate and independent, including separated by being in different computers or one or more being in a remote server accessible across a communications network.

The media library 230 includes information about one or more of the media files 224 of the directory system 226. This information includes references, which point to locations of the media files 224, such as with hyperlinks. This information can also include metadata, such as an artist, genre, album name, song name, movie directory, release date, and the like for the media files 224. This metadata information is often appreciated by users because it enables users to learn more about their media. In some cases users can arrange their media in the media library 230 based on this metadata information. Metadata is one reason many users prefer media libraries to directory systems to view and manage their media.

The synchronizer 232 is capable of determining whether or not folders have been modified. It is also capable of scanning folders to determine how folders have been modified, such as whether or not a new media file has been added or an existing media file has been deleted or moved from a folder. Also, the synchronizer 232 is capable of modifying the media library 230 to synchronize the media library 230 with the media files 224 of the directory system 226. In some implementations, the synchronizer 232 records into the record 234 information about folders and the media files 224 within them.

How and under what conditions the synchronizer 232 acts will be covered in greater detail below, especially as part of exemplary methods set forth in FIGS. 3 to 7.

The Record

The record 234 includes information portraying various folders and the media files 224 in the harddrive 222. This information is recorded into the record 234 by various parts of the system 200 or from remote sources. In one implementation, the media player 228 or the synchronizer 232 records information into the record 234.

With the information in the record 234 the synchronizer 232 can determine the status of folders of the directory system 226 and the media files 224 that are arranged within them. This status of the folders can be current or be from a prior time. In cases where the status if from a prior time the synchronizer 232 can use the prior status to determine if the folders within the directory system 226 have been modified since that prior time.

The record 234 can also be a one-to-one mapping of this information about folders of the directory system 226. This mapping can mimic a structure of the folders within the directory system 226, including if the folders are arranged in a hierarchical structure. The record can include information or be written in various languages, including eXtensible Markup Language (XML), "C" and its progeny, and other languages.

As shown in FIG. 2, the record 234 can include four ways to keep track of folders of the directory system 226. In this example the record 234 includes folder names 236, folder modification times 238, folder change indicators 240, and folder stale indicators 242.

The folder names 236 include names of folders with which the synchronizer 232 maintains synchronization between the media files 224 within those folders and the media library 230. In one implementation, if a user wishes the media files 224 within certain folders to be synchronized, the user can select these folders. In another implementation, a default list of folders likely to contain one or more of the media files 224 are kept in sync with the media library 230. Names of subfolders within the named folders can also be include or excluded by a user or through default settings. In certain cases a subfolder but not a folder will be listed, in other cases a folder but one or more of its subfolders will not be listed.

The folder modification times 238 include times that folders named in the folder names 236 have been modified. These folder modification times 238 include a last-modified-time of a folder when it was last checked and recorded into the record 234. A last-modified-time of a folder is a time when content within the folder were last modified. This content can include one or more of the media files 224, subfolders, sub-subfolders, other non-media content, and the like. By checking times in which a folder was recorded to be last modified against a current last-modified-time, the synchronizer 232 can determine if contents within the folder have been modified since the last time it was checked.

If the synchronizer 232 determines that a folder's contents have been changed, it can so indicate in the record 234 with the folder change indicators 240. The folder change indicators 240 can include information regarding whether or not contents of a particular folder have been changed.

The record 234 also includes the folder stale indicators 242, which indicate whether a folder should be checked for a new last-modification time. The folder stale indicators 242 can indicate that a folder should be checked based on various criteria. In one implementation, folders are marked "stale" and so needing to be checked after a certain amount of time has passed. Similarly, if the folder stale indicator 242 is not set to "stale" for a particular folder, it has been recently checked. In another implementation, they are marked stale if the synchronizer 232, the media library 230, or the media player 228 have not been running since the last time the folder was checked. The synchronizer 232 can set the folder stale indicators 242, or it can be set by the media library 230 or the media player 228.

Selective Synchronizing of Modified Folders

Figure 3:
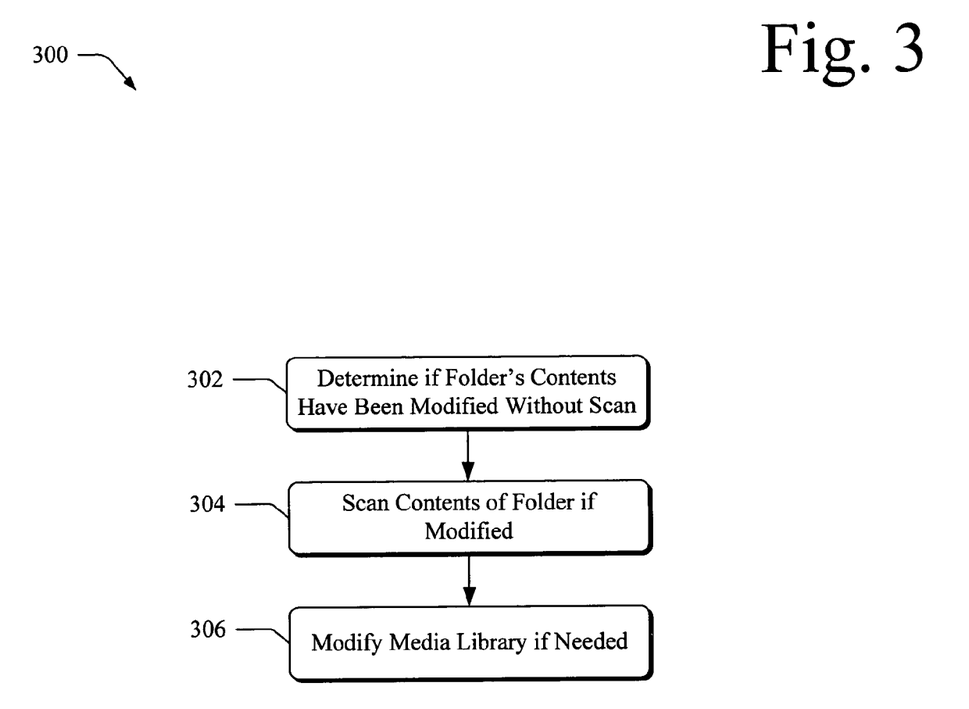
FIG. 3 is a flow diagram of an exemplary method for synchronizing accessible media files with a media library.

FIG. 3 shows a flow diagram 300 for synchronizing, with a media library, folders that have been modified. This and the following flow diagrams are illustrated as series of blocks representing operations or acts performed by the system 200. These diagrams may be implemented in any suitable hardware, software, firmware, or combination thereof. In the case of software and firmware, they represent sets of operations implemented as computer-executable instructions stored in memory and executable by one or more processors.

In the flow diagram 300, the system 200 determines which folders in the directory system 226 have been modified, scans the content of the folders, and based on the changed content modifies the media library 230, if needed. The system 200 can do so without user interaction, such as automatically when a user opens the media player 228. The system 200 can also do so once prompted by a user.

In block 302, the system 200 (here with the synchronizer 232) determines if a folder's contents have been modified without scanning the contents. The synchronizer 232 can determine this in various ways, such as by comparing a currently checked last-modified-time of each folder with an older-checked last-modified-time. The synchronizer 232 can determine by itself if a folder's contents have been modified or can do so with a module included within or without the synchronizer 232. This module can be a program, applet, or otherwise, which can be called by the synchronizer 232 with an API (Application Program Interface).

By comparing these times, which will be discussed in greater detail below, the synchronizer 232 can determine if the contents of the folder have been modified since the last time the synchronizer 232 checked the folder. Determining if the folder's contents have been modified can be performed more quickly than scanning the contents of each folder, especially if the folder contains many files.

In determining if the folder's contents have been modified without scanning the contents, the synchronizer 232 quickly sets aside folders that have not been modified. The synchronizer 232 can set aside all those folders that have not been modified, and instead scan those that have been.

By scanning only some or perhaps even none of the folders, the synchronizer 232 can much more quickly synchronize the folders (and the media files 224 within them) with the media library 230. If, for instance, there are five folders of the directory system 226 that need to be synchronized and each contains over 1000 files but only one of the folders has been modified, the time needed to synchronize the content of these folders with the media library 306 by scanning all five folders could be prohibitively slow. Thus, by scanning only the one folder that has been modified rather than all five, the synchronizer 232 can synchronize the contents about five time faster.

Further, in one implementation the synchronizer 232 determines if subfolders have been modified without scanning the contents of the subfolders. Continuing the ongoing example, if the one modified folder contains 1000 files, ten in the folder and 990 in two subfolders of the folder (400 in one and 590 in another), the synchronizer 232 can forego scanning all 1000 files unless necessary. Instead, the synchronizer 232 can determine whether contents of the two subfolders have been modified without scanning the contents of the two subfolders. If the two subfolders have not been modified, the 990 files within them will not be scanned, thereby improving a speed and efficiency of the synchronization. If only one of the subfolders has been modified, only it will be scanned, also improving the speed and efficiency of the synchronization.

In block 304 the synchronizer 232 scans contents of the folder if it has been modified. Here the synchronizer 232 preferentially scans those folders that have been determined to be modified as part of the block 302 rather than those that have been determined to not have been modified. The synchronizer 232 can perform the scan itself or with a module included within or without the synchronizer 232. This module can be a program, applet, or otherwise, which can be called by the synchronizer 232 with an API.

In scanning the folder, the synchronizer 232 determines the current state of the contents of the folder. This includes which subfolders and files are in the folder, when they were added, and the like. (If a subfolder of the contents of the folder has not been modified, it may not have to be scanned). With the current contents of the folder, the synchronizer 232 determines what has changed since the folder was last scanned. The previous content of the folder, which is determined when the folder was last scanned, has been retained. Information about the previous (and new) contents of the folder can be stored in the record 234.

In one implementation the synchronizer 232 can ignore those files that are not media files or are otherwise not of interest to the media library 230. In this implementation, the synchronizer 232 determines the state of the media files 224 that are within the scanned folder. In our ongoing example, if one of five folders was modified, the synchronizer 232 can then scan that folder and determine, for example, that of the 1000 files, 100 are media files of the media files 224. Also for example, assume that the synchronizer 232 determines the folder and subfolder locations of each of the 100 media files and the times that they were added to the folder. This information can be used by the synchronizer 232 to determine if the media library 230 needs to be modified.

In another implementation, the synchronizer 232 can pause before proceeding to scan the contents (block 304). This pause can include waiting until the processing unit 218 can provide sufficient computational cycles to allow the synchronizer 232 to perform the scan without hindering other applications running on the computer 208.

In block 306 the synchronizer 232 modifies the media library 230 if needed. Here the synchronizer 232 determines if the media library 230 adequately includes the media-file contents of the folder that has been scanned. (Being included in the media library 230 can mean that a reference to a media file is within the media library 230, such as a hyperlink or a location where the media file is stored).

In some cases the scan in block 304 will not show changes to one of the media files 224 (such as one being deleted, added, or moved). This can be due to the folder having been modified in some way that does not modify the media files 224, such as by a non-media file being added or deleted from the folder. In these cases the synchronizer 232 does not have to modify the media library 230.

In other cases there will be a change to the media files 224 that needs to be reflected in the media library 230. In still other cases, which will be discussed in greater detail below, there is a change to the media files 224 but that change should not be reflected in the media library 230.

Determining if a Folder's Contents have been Modified

Figure 4:
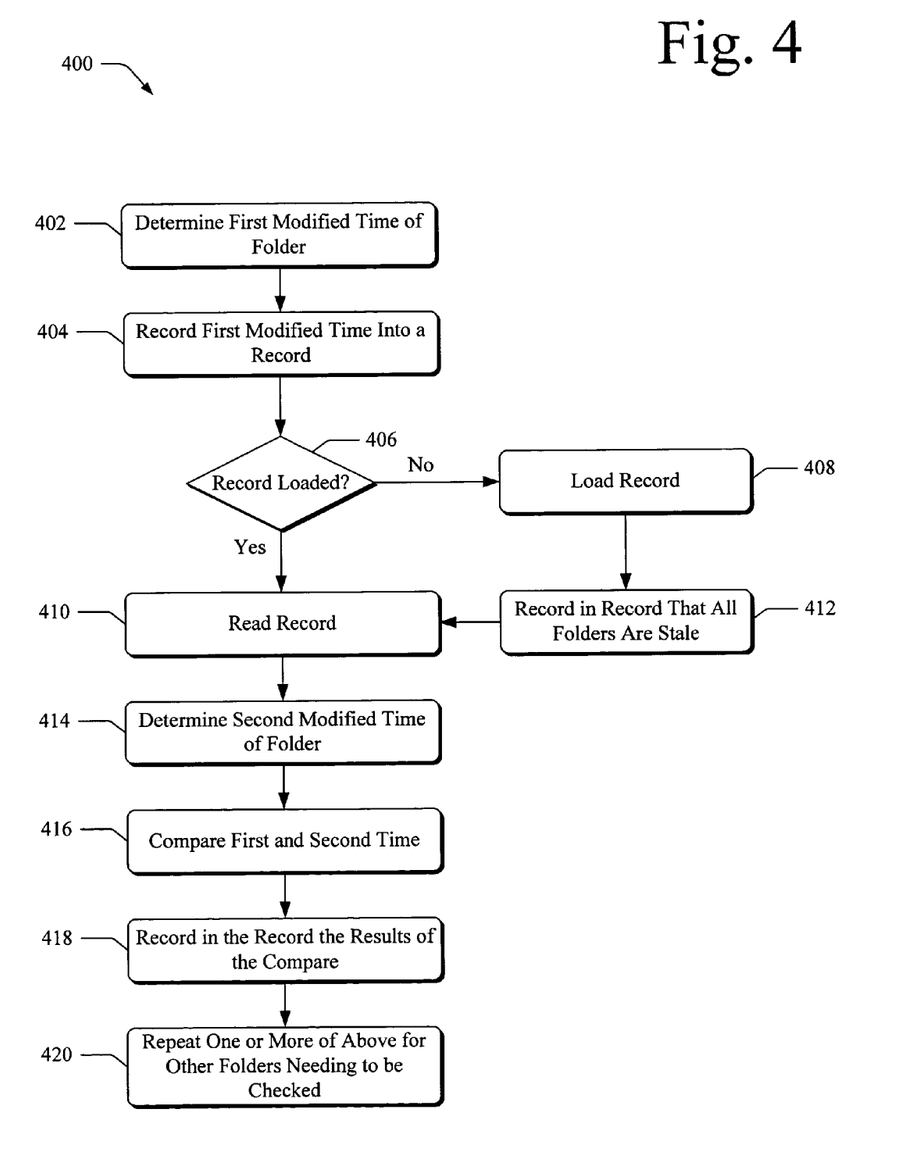
FIG. 4 is a flow diagram of an exemplary method for determining if a folder has been modified.

FIG. 4 shows a flow diagram 400 setting forth one way in which the system 200 can determine if a folder's contents have been modified without scanning the contents. This flow diagram 400 is an exemplary implementation of the block 302 of FIG. 3.

In block 402, the system 200 (here with the synchronizer 232) determines a modified time of the folder. The synchronizer 232 can determine this modified time of the folder by communicating with the directory system 226.

In block 404, the synchronizer 232 records this modified time into the record 234. The synchronizer 232 records this modified time because in the future it can use this modified time to determine if the folder has been modified since recording this modified time. Thus, this modified time will be an old modified time when the synchronizer later checks it against a potentially newer modified time.

In block 406 the system 200 determines if the record 234 is loaded. If it is not loaded, the system 200 proceeds along the "No" path to block 408. If it is loaded, the system 200 proceeds along the "Yes" path to block 410.

Between block 406 and 408 the record 234 could have been shut down. This can happen when a user of the media player 228 or the media library 230 shuts down either of these applications. It can also happen when the computer 208 is shut down (intentionally or by crashing, for instance).

In block 408 the system 200 loads the record 234.

In block 412, the system 200 alters the record 234 to show that all of the folders need to be checked for new modification times (called "stale"). This informs the synchronizer 232 that it needs to check for a new modification time for each of the folders listed in the folder names 236 (discussed below). The system 200 can mark that each folder needs to be checked by including within the record 234 that the folder is "stale" with the folder stale indicators 242.

In block 410 the synchronizer 232 reads the record 234. The synchronizer 232 can proceed to block 414 based on information in the record 234 or can pause. If the record 234 shows that a folder is marked with the folder stale indicator 242 as being stale, the synchronizer 232 can immediately proceed to step 414. This is because if it is marked "stale" in the record 234, the modification time of the folder probably has not been checked in a while. Since it was last checked the synchronizer 232 may have been off (which happens in one implementation when the media player 228 or the media library 230 is not running), and so the media files 224 in the folder may have been altered since the synchronizer 232 ceased running.

In either case the synchronizer can access the first or old modified time of the folder recorded into the record 234 at the block 404.

If the record 234 does not show that any folders are "stale" with the stale indicators 242, the synchronizer 232 can pause before proceeding to block 414. The synchronizer 232 pauses to not waste the computer's 208 resources, such as computation time. In one implementation, however, the synchronizer 232 does not pause, but continues checking modification times for folders whenever it is not doing something else. The synchronizer 232 can pause a very short period of time, such as a fraction of a second, before proceeding to block 414, or longer. How long can depend on a user's preference, the availability of the processing unit 218, or a set amount of time.

In block 414, the synchronizer 232 determines a second (new) modified time of the folder. The synchronizer 232 can do so in a similar manner to that set forth in the block 402.

In block 416, the synchronizer 232 compares the first (old) time with the second (new) time. Here the synchronizer 232 is determining whether or not the folder has been modified since it's modification time was last checked.

In block 418, the synchronizer 232 records the results of the comparison into the record 234. The synchronizer 232 does so in order to not waste effort if the synchronizer 232 is turned off before the synchronizer 232 has the time to proceed to scanning the folder and modifying the media library 230 (shown in FIG. 3). If the synchronizer 232 ceases running prior to scanning and modifying, the synchronizer 232 can, once it is running again, then read the record 234 and thereby determine whether or not the folder needs to be scanned.

The result of this comparison of block 418 is either that the folder has been modified or has not been modified. If the times are not equivalent, the folder has been modified, and so the synchronizer 232 records into the record 234 that the folder has been modified by marking the folder with the folder change indicator 240 being "yes." This change indicator 240 can inform the synchronizer 232 at some later time (though this time may be only fractions of a second from the current time) that the synchronizer 232 needs to scan the folder. If the folder has not been modified (the times are equivalent), the synchronizer 232 records into the record 234 that the folder has not been modified. The synchronizer 232 can do so by marking the folder with the folder change indicator 240 being "no."

In block 420, the synchronizer 232 can proceed to repeat some or all of the blocks 402 to 418 for other folders or subfolders. The synchronizer 232 can do so or can proceed to scanning the folder and modifying the media library 230 (shown in FIG. 3) for the folder (if it was changed and the change was not reflected in the media library 230) before proceeding to check modification times for other folders and subfolders. Whether it does so or not depends on various factors, which will be discussed below.

Modifying the Media Library If Needed

Figure 5:
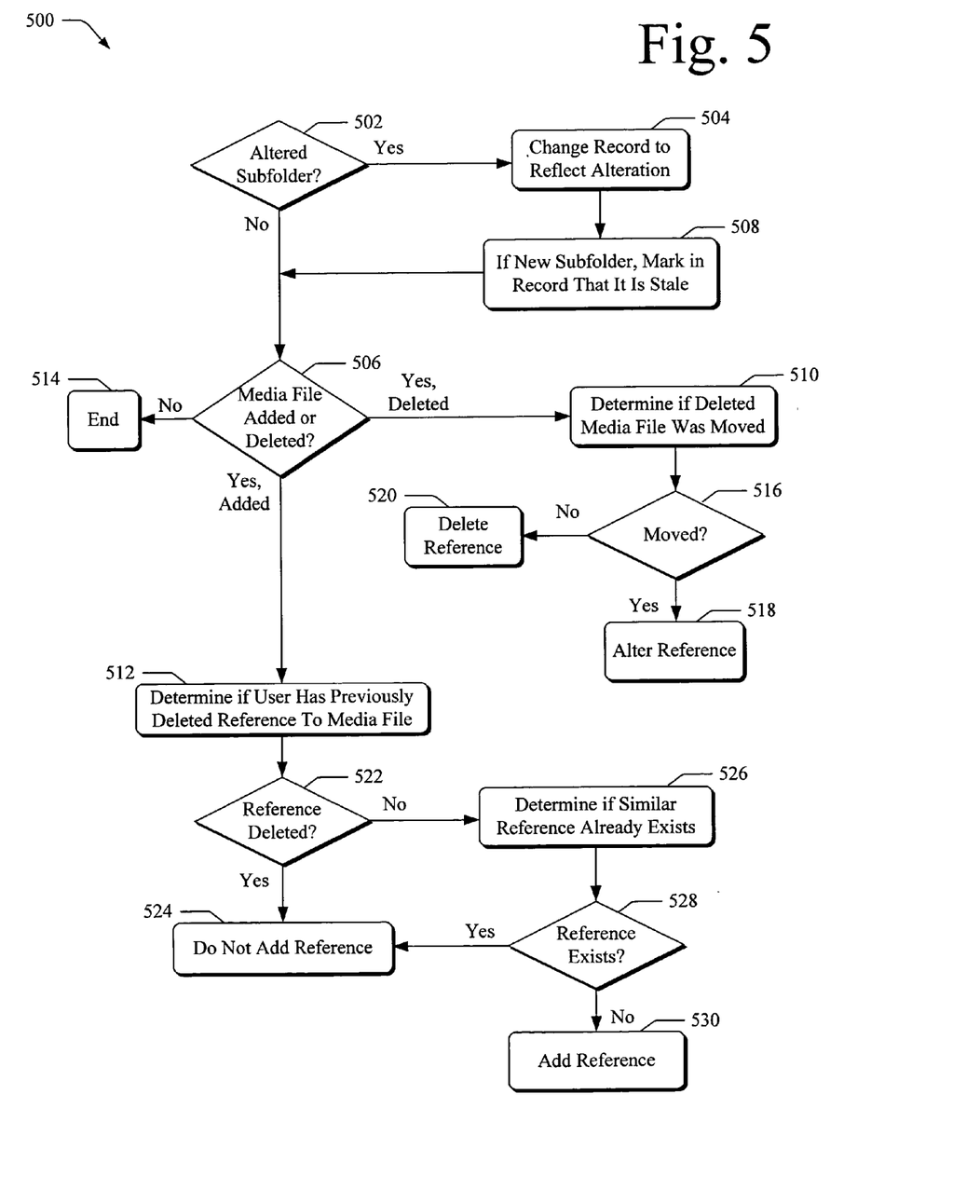
FIG. 5 is a flow diagram of an exemplary method for modifying a media library.

FIG. 5 shows a flow diagram 500 setting forth one way in which the system 200 can modify the media library 230 if needed. Here the synchronizer 232 determines if the media library 230 adequately includes the media-file contents and structure of the folder that has been scanned. This flow diagram 500 is an exemplary implementation of the block 306 of FIG. 3.

Prior to block 502, the system 200 has determined that a folder has been modified, and has scanned that folder to determine a change to the contents of the folder. The change can be to the media files 224 that are or were in the folder, or a change to the structure within the folder, such as a subfolder or sub-subfolder being deleted, added, or moved.

In block 502, the synchronizer 232 determines if there has been an alteration to a subfolder (or sub-subfolder and so on) in the folder. If yes, the synchronizer 232 proceeds along the "Yes" path to block 504. If not, it proceeds along the "No" path to block 506.

In block 504 the synchronizer 232 changes the record 234 to reflect the alteration. The record 234 can reflect the structure of the folders in the directory system 226. This reflection includes the folders that the synchronizer 232 maintains synchronization with the media library 230. Thus, when a folder listed in the folder names 236 has a subfolder added, deleted, or moved, the record 234 is altered by the synchronizer 232 to reflect that change.

In block 508, when a new subfolder is added to the record 234, the synchronizer 232 marks the subfolder and its parent(s) stale with the stale indicators 242. The synchronizer 232 does so to later inform the synchronizer 232, when the synchronizer 232 is checking folder modification times, that the folder and its subfolder need to have their modification times checked.

In block 506, the synchronizer 232 determines if a media file of the media files 224 has been added or deleted from the folder. If yes and deleted, the synchronizer 232 proceeds along the "Yes, Deleted" path to block 510. If yes and added, the synchronizer 232 proceeds along the "Yes, Added" path to block 512. If no, the synchronizer 232 proceeds along the "No" path to block 514.

In block 514, the synchronizer 232 ends the modification process.

In block 510, the synchronizer 232 determines if the deleted media file was moved. A media file can be deleted from a folder but be moved to another folder. In such a case, the synchronizer 232 does not delete a reference in the media library 230 to the media file only to add another later when if finds the media file in another location. By so doing the synchronizer 232 avoids deleting information from the media library 230 that a user may want to retain. For instance, a reference in the media library 230 to a media file in a first folder can contain metadata. This metadata can include information useful to the user of the media player 228, such as how often the user plays the media file, what genre the user wishes the media file to be organized into within the media library 230, and many other kinds of information. If the synchronizer 232 deletes the reference to the media file this information could be lost. By determining whether or not media files have been moved, the synchronizer 232 improves a user's ability to maintain important information about his or her media files.

The synchronizer 232 can determine if a media file is moved similarly to how it determines that a change is made to a folder. The synchronizer 232 can continue synchronizing folders and the media files 224 with the media library 230 and if the synchronizer 232 has finished synchronizing all of the media files 224 with the media library 230, determine if any media file similar or identical to the media file deleted from this folder was added to another folder.

In block 516, the synchronizer 232 proceeds along the "Yes" path to block 518 if the media file was actually moved rather than deleted. The synchronizer 232 proceeds along the "No" path to block 520 if the synchronizer 232 determines that the media file was not moved.

In block 518 the synchronizer 232 alters the reference to the media file in the media library 230. The synchronizer 232 can alter the reference by changing a link or hyperlink to refer to a new location for the media file. By so doing, if a user selects the media file in the media library 230 (such as by clicking on the reference to have in played by the media player 228), the media player 228 will have the correct address for the moved media file.

In block 520 the synchronizer 232 deletes the reference to the media file in the media library 230.

In block 512, the synchronizer 232 determines if a user has previously deleted a reference in the media library that is to the media file that was just added to the folder. This deletion of a reference from the media library 230 can be found from the record 234 or the media library 230, or some other accessible record. The synchronizer 232 determines if a reference was previously deleted to further improve a user's experience with the media library 230. This feature allows a user to delete a reference to a media file from the media library 230 and not have another reference to that media file be added back into the media library 230. This is helpful in many situations, such as when a user has files that he or she does not want to see in his or her media library. Some users, for instance, do not want short song clips, sound effects files (like for video games), and the like cluttering up his or her media library.

In block 522, if the reference was previously deleted, the synchronizer 232 proceeds along the "Yes" path to block 524. If it was not deleted, the synchronizer 232 proceeds along the "No" path to block 526.

In block 524, the synchronizer 232 does not add a reference to the added media file if a reference to that or a similar media file has previously been deleted from the media library 230.

In block 526 the synchronizer 232 determines if a similar reference already exists in the media library 230.

In block 528, if the reference already exists, the synchronizer 232 proceeds along the "Yes" path to block 524. If it does not, the synchronizer 232 proceeds along the "No" path to block 530.

By not adding a reference to the added media file if a similar reference already exists, the synchronizer 232 does not duplicate references to similar or identical media (like a particular song). Duplicating references to the same or similar media file can clutter up the media library 230.

In block 530, the synchronizer 232 adds a reference to the added media file in the media library 230. This reference, like other references in the media library 230, can include a link or hyperlink to the media file's location in the directory system 226. It can also include metadata, discussed in part above, which can describe the media file and enable the media file to be arranged in the media library 230. This metadata can be accessed by the synchronizer 232 as part of the media file or by the synchronizer 232 accessing metadata about the media file from other sources. These other sources can include information from various companies, websites, and the like that are accessible across a communication network. The other sources can also include local information, such as information about media files stored in the computer 208 on a local memory device.

Prioritizing Between Two or More Modified Folders

Figure 6:
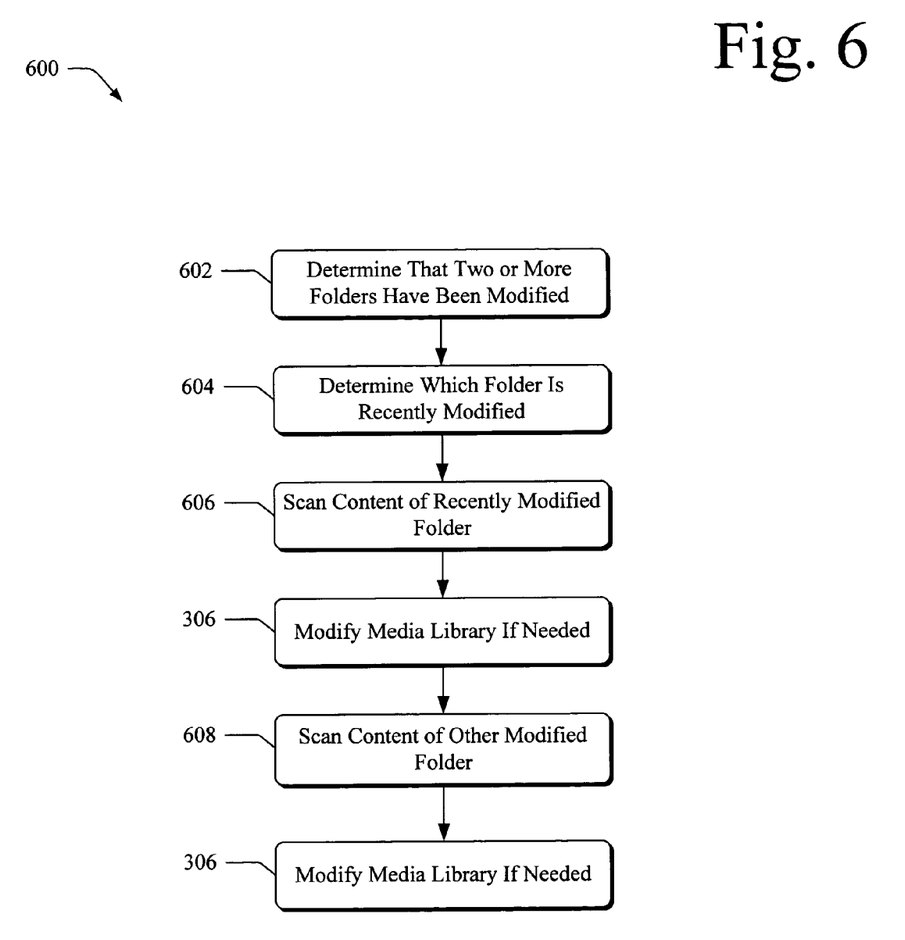
FIG. 6 is a flow diagram of an exemplary method for prioritizing between modified folders.

FIG. 6 shows a flow diagram 600 for prioritizing between two or more modified folders. In the flow diagram 600, the system 200 determines which folder has recently been modified and scans that folder prior to scanning folders that have not recently been modified. The system 200 can preferentially scan (and then modify the media library 230 if needed) to perform first those tasks often wanted first by a user. If, for instance, one modified folder was modified yesterday (perhaps when the media player 238 and the synchronizer 232 were not running) and another was modified three seconds ago, the system 200 can scan the just-modified folder first. This prioritization is useful because, if a user has just modified a folder—such as by adding a media file to the folder, the user often wants the media library 230 to reflect this change as quickly as possible. Just after adding a media file (such as by purchasing and downloading it from an online source), a user may want to play that file right away. This flow diagram 600 shows how the system 200 can allow the user to have a reference added (or moved or deleted) in the media library 230 preferentially.

In block 602 the system 200 (here with the synchronizer 232) determines that two or more folders have been modified. The synchronizer 232 can determine this by checking modification times for the folders in the folder names 236 of the record 234. As set forth as part of the description above (see the flow diagram 400 of FIG. 4), the synchronizer 232 can record when a folder has been modified. It can do so by marking, in the record 234, that the folder has been modified, such as with the folder change indicator 240 being "yes."

Figure 7:
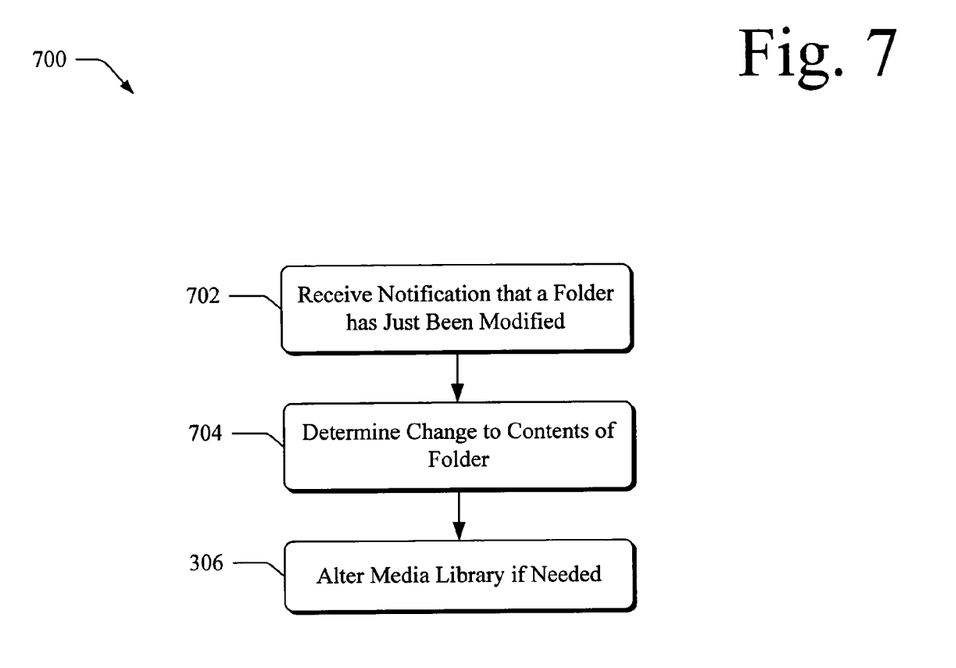
FIG. 7 is a flow diagram of an exemplary method for ongoing synchronization of accessible media files with a media library.

The system 200 can also determine that two or more folders have been modified by receiving notification that a folder have just been modified. The system 200 can do so as shown in FIG. 7 and its accompanying description, set forth below.

In another implementation, the system 200 determines that two or more folders have been modified by a combination of notification and determining. By way of example, the system 200 (here with the synchronizer 232) can determine that one or more folders have been changed by checking modification times of folders as well as receiving notification that a folder has just been modified.

In block 604, the synchronizer 232 determines which folder or folders have recently been modified. The synchronizer 232 can do so by checking modification times for folders, or can do so by receiving notification that a folder or a media file within the folder has just been modified. If the synchronizer 232 receives notification that a folder or media file within the folder has just been modified, the synchronizer 232 preferentially scans that folder first. Notification of changes is discussed in greater in a description of FIG. 7, below.

In one implementation, the synchronizer 232 follows the flow diagram 400 and, prior to scanning a recently modified folder, continues on to check modification times for the remaining folders (described in the block 420 of FIG. 4). These modification times can be recorded in the record 234. With these modification times checked and recorded into the record 234, the synchronizer 232 can determine which folder is most recently modified by comparing the most recent modification times of the modified folders.

In another implementation, the synchronizer 232 does not, prior to scanning a recently modified folder, continue on to check modification times for the remaining folders. In this implementation, the synchronizer 232 assumes that a recently modified folder has been more recently modified than the folders of which the synchronizer 232 has not checked their modification times. If, for instance, the synchronizer 232 has been off, the synchronizer 232 may not be aware that certain folders were modified while it was off. When the synchronizer 232 is running again and then receives a notification that a folder has just been modified, the synchronizer 232 can assume that the folder that has just been modified has been modified more recently than folders that the synchronizer 232 has not checked for a modification time (such as those that may have been modified when the synchronizer 232 was off). In this implementation, the synchronizer 232 scans the recently modified folder prior to continuing to check modification times for other folders.

In some cases, however, the synchronizer 232 receives notification that a first folder and a second folder have just been modified. In such cases, the synchronizer 232 knows of two folders that have recently been modified. Both of these folders should be scanned. How the synchronizer 232 handles this is set forth in block 606 below.

In block 606, the synchronizer 232 scans contents of a recently modified folder. The contents scanned can include all content, or the media-file content (of the media files 224) and the structure in which the media files 224 are contained. This scan is performed as set forth above for scanning of a folder.

In some cases, there is more than one recently modified folder, such as in the example set forth above having two recently modified folders. The synchronizer 232 can select between these folders in various ways. In one implementation, the synchronizer 232 scans the most-recently modified folder. In another implementation, the synchronizer 232 scans first the folder that is likely to take the least time or resources to scan. In still another implementation, the synchronizer 232 scans the folder about which the synchronizer 232 first received notification of its being modified (which is often not the most-recently modified folder).

Following block 606, the synchronizer 232 modifies the media library 230 if needed, as set forth in the description of the block 306 above for modifying the media library 230 based on a change in a folder.

In block 608, the synchronizer 232 scans contents of another modified folder. The synchronizer 232 can scan the second-most-recently modified folder or otherwise. The contents scanned can include all content, or the media-file content (of the media files 224) and the structure in which the media files 224 are contained. This scan is performed as set forth above for scanning of a folder.

In cases where the synchronizer 232 has just scanned a recently modified folder and no other recently modified folders are in need of scanning, the synchronizer 232 can proceed in various ways to scan other folders. The synchronizer 232 can proceed by scanning the most recently modified folder. The synchronizer 232 can also proceed by scanning the first folder, of those needing to be scanned, listed in the folder names 236. In some situations determining which of the remaining folders has most recently been scanned takes excessive time or resources. Also, doing so can gain a user little, such as when the other folders were all modified days ago. In such cases, the user is unlikely to care which of the long-ago modified folders are scanned first. This is one example of a situation in which the synchronizer 232 can proceed in scanning folders in an arbitrary order.

Similarly to above and following the block 608, the synchronizer 232 modifies the media library 230 if needed, as set forth in the description of the block 306 above for modifying the media library 230 based on a change in a folder.

Receiving Notification that a Folder has Just Been Modified

FIG. 7 shows a flow diagram 700 for how the system 200 receives and reacts to receiving notification that a folder has just been modified. In some cases the synchronizer 232 will be running, performing various tasks such as those described above, and will receive a notification that a folder has just been modified. This notification can be given high priority, including priority above that of proceeding on to a following task of the above flow diagrams.

The synchronizer 232 can give a high priority to a notification in order to promptly address a new change. New changes made while the synchronizer 232 is running, especially if the synchronizer 232 runs only when the media player 228 is running, can indicate that a user has just altered a media file in one of the folders listed in the folder names 236. In such a case, users often want to have these changes addressed more quickly. If a user just added a media file (like a music video or song) to a folder, often the user desires to view and play that media file as soon as possible.

The flow diagram 700 shows how the system 200 addresses this desire of a user.

In block 702 the system 200 receives notification that a folder has just been modified. This notification can be received from the computer 208, the directory system 226, or other sources. The notification should be for a current modification so that the synchronizer 232 does not give precedence to a notice for an old modification.

Once this notification is received, the system 200 (through the synchronizer 232) can record that the folder noticed has been modified. This record can include marking in the record 234 with the folder change indicator 240 that the folder has been modified. This recording can be useful if the synchronizer 232 ceases to run prior to being able to proceed to blocks 704 and 306. The synchronizer 232 can read the record 234 when the synchronizer 232 begins running, and so can continue on with blocks 704 and 306 based on the information recorded into and read from the record 234 if the synchronizer 232 ceases running between the blocks 702 and 704.

Also once this notification is received, the synchronizer 232 can proceed directly to block 704, or can wait until the processing unit 218 can provide sufficient computational cycles to allow the synchronizer 232 to perform block 704 without hindering other applications running on the computer 208.

In block 704, the synchronizer 232 determines what changes have been made to the contents of the folder. As set forth above, these contents can include media-file contents and related structures or all of the contents. The synchronizer 232 makes the determination of the change as set forth in the various implementations above, such as by scanning the contents.

After block 704, the synchronizer 232 alters the media library 230 to reflect the change, if needed. The synchronizer 232 does so as set forth for block 306 above.

A Computer System

Figure 8:
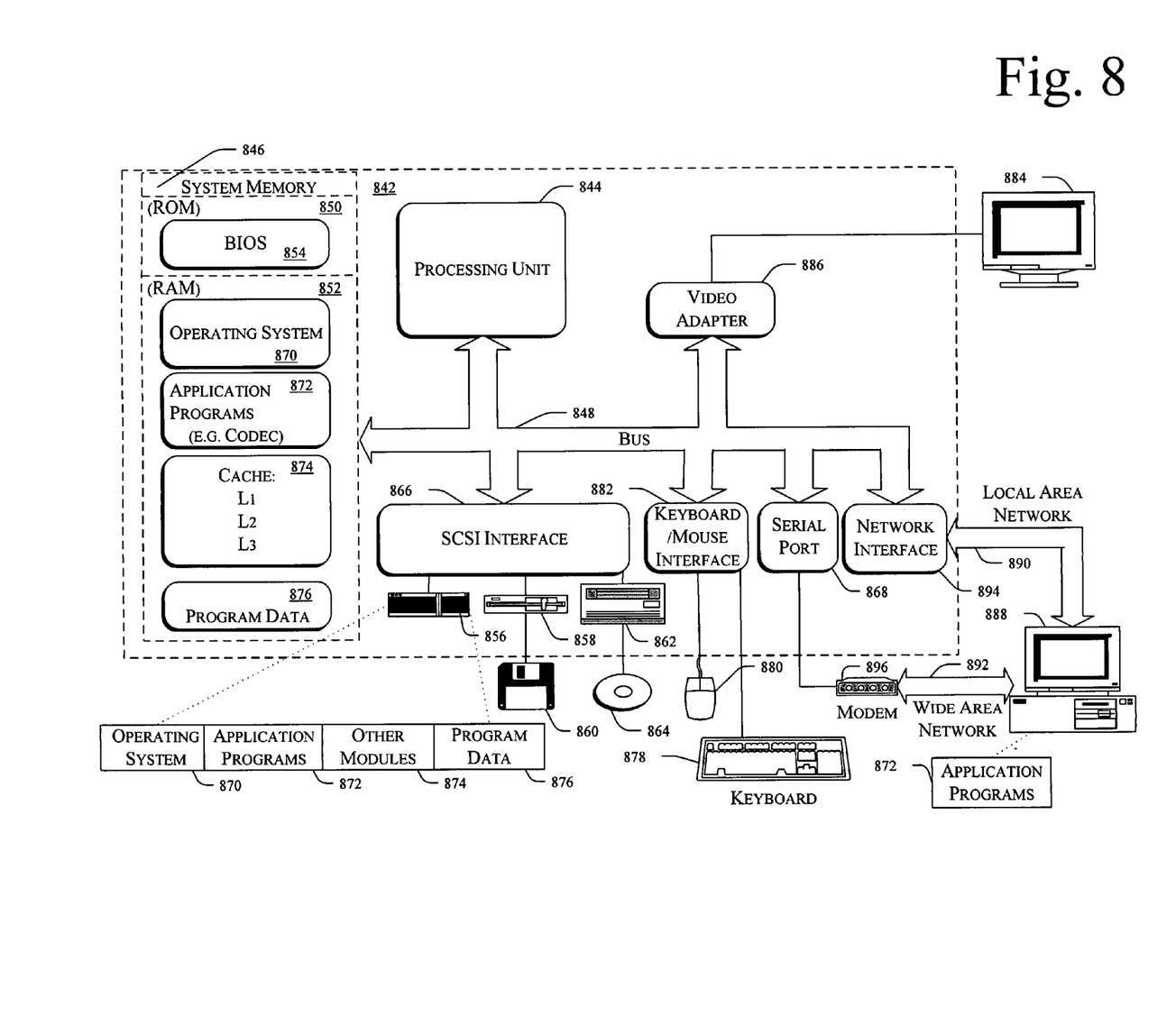
FIG. 8 is a block diagram of a computer system that is capable of implementing a method for selectively synchronizing media files with a media library.

FIG. 8 shows an exemplary computer system that can be used to implement the processes described herein. Computer 842 includes one or more processors or processing units 844, a system memory 846, and a bus 848 that couples various system components including the system memory 846 to processors 844. The bus 848 represents one or more of any of several types of bus structures, including a memory bus or memory controller, a peripheral bus, an accelerated graphics port, and a processor or local bus using any of a variety of bus systems. The system memory 846 includes read only memory (ROM) 850 and random access memory (RAM) 852. A basic input/output system (BIOS) 854, containing the basic routines that help to transfer information between elements within computer 842, such as during start-up, is stored in ROM 850.

Computer 842 further includes a hard disk drive 856 for reading from and writing to a hard disk (not shown), a magnetic disk drive 858 for reading from and writing to a removable magnetic disk 860, and an optical disk drive 862 for reading from or writing to a removable optical disk 864 such as a CD ROM or other optical media. The hard disk drive 856, magnetic disk drive 858, and optical disk drive 862 are connected to the bus 848 by an SCSI interface 866 or some other appropriate interface. The drives and their associated computer-readable media provide nonvolatile storage of computer-readable instructions, data structures, program modules and other data for computer 842. Although the exemplary environment described herein employs a hard disk, a removable magnetic disk 860 and a removable optical disk 864, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 856, magnetic disk 860, optical disk 864, ROM 850, or RAM 852, including an operating system 870, one or more application programs 872 (such as the synchronizer 232), other program modules 874, and program data 876. A user may enter commands and information into computer 842 through input devices such as a keyboard 878 and a pointing device 880. Other input devices (not shown) may include a microphone, joystick, game pad, satellite dish, scanner, or the like. These and other input devices are connected to the processing unit 844 through an interface 882 that is coupled to the bus 848. A monitor 884 or other type of display device is also connected to the bus 848 via an interface, such as a video adapter 886. In addition to the monitor, personal computers typically include other peripheral output devices (not shown) such as speakers and printers.

Computer 842 commonly operates in a networked environment using logical connections to one or more remote computers, such as a remote computer 888. The remote computer 888 may be another personal computer, a server, a router, a network PC, a peer device or other common network node, and typically includes many or all of the elements described above relative to computer 842. The logical connections depicted in FIG. 8 include a local area network (LAN) 890 and a wide area network (WAN) 892.

Such networking environments are commonplace in offices, enterprise-wide computer networks, intranets, and the Internet.

When used in a LAN networking environment, computer 842 is connected to the local network through a network interface or adapter 894. When used in a WAN networking environment, computer 842 typically includes a modem 896 or other means for establishing communications over the wide area network 892, such as the Internet. The modem 896, which may be internal or external, is connected to the bus 848 via a serial port interface 868. In a networked environment, program modules depicted relative to the personal computer 842, or portions thereof, may be stored in the remote memory storage device. It will be appreciated that the network connections shown are exemplary and other means of establishing a communications link between the computers may be used.

Generally, the data processors of computer 842 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the blocks described below in conjunction with a microprocessor or other data processor. The invention also includes the computer itself when programmed according to the methods and techniques described herein.

For purposes of illustration, programs and other executable program components such as the operating system are illustrated herein as discrete blocks, although it is recognized that such programs and components reside at various times in different storage components of the computer, and are executed by the data processor(s) of the computer.

CONCLUSION

The above-described system and method enables synchronization of a media library with a filing system. This synchronization can be automatic and without interaction from a user. Also, this system and method can selectively and preferentially synchronize media files within certain folders rather than other folders based on whether or not those folders have been modified. Further, this system and method can maintain synchronization between a media library and a filing system by regularly checking for changes in a filing system. Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method comprising:

reading a record containing old times that one or more folders in a computer's filing system were last modified;

marking in the record that each of the one or more folders needs to have new times determined;

determining a new time that a first folder of the one or more folders in the computer's filing system was last modified;

comparing the new time for the first folder with the old time for the first folder;

marking in the record that the first folder needs to be scanned if the new time and the old time are not equivalent or does not need to be scanned if the new time and the old time are equivalent;

determining if the new time and the old time of the first folder are not equivalent, a second folder's new time that a second folder of the one or more folders in the computer's filing system was last modified;

scanning media-file contents of the first folder if the new time and the old time of the first folder are not equivalent;

modifying, if the media-file contents of the first folder have changed, a media library based on the change comparing the second folder's new time with the old time for the second folder and then mark in the record that the second folder needs to be scanned if the second folder's new time and the old time of the second folder are not equivalent or does not need to be scanned if the second folder's new time and the old time of the second folder are equivalent.

2. The method of claim 1, further comprising:

marking in the record, prior to the determining the new time for the first folder, that, each of the one or more folders needs to have new times determined.

3. The method of claim 1, further comprising:

marking in the record, prior to the determining the new time for the first folder, that each of the one or more folders needs to have new times determined; and marking in the record, after the comparing, that the first folder needs to be scanned if the new time and the old time are not equivalent or does not need to be scanned if the new time and the old time are equivalent.

4. A computer-readable storage medium comprising computer readable instructions that perform the following when executed by a computer:

read a record containing old times that one or more folders in a computer's filing system were last modified;

mark in the record that each of the one or more folders needs to have new times determined;

determine a new time that a first folder of the one or more folders in the computer's filing system was last modified;

compare the new time for the first folder with the old time for the first folder;

mark in the record that the first folder needs to be scanned if the new time and the old time are not equivalent or does not need to be scanned if the new time and the old time are equivalent;

determine if the new time and the old time of the first folder are not equivalent, a second folder's new time that a second folder of the one or more folders in the computer's filing system was last modified;

scan media-file contents of the first folder if the new time and the old time of the first folder are not equivalent;

modify, if the media-file contents of the first folder have changed, a media library based on the change; and, compare the second folder's new time with the old time for the second folder and then mark in the record that the second folder needs to be scanned if the second folder's new time and the old time of the second folder are not equivalent or does not need to be scanned if the second folder's new time and the old time of the second folder are equivalent.

5. An apparatus, comprising:
means for reading a record containing old times that one or more folders in a computer's filing system were last modified;
means for marking in the record that each of the one or more folders needs to have new times determined;
means for determining a new time that a first folder of the one or more folders in the computer's filing system was last modified;
means for comparing the new time for the first folder with the old time for the first folder;
means for marking in the record that the first folder needs to be scanned if the new time and the old time are not equivalent or does not need to be scanned if the new time and the old time are equivalent;
means for determining if the new time and the old time of the first folder are not equivalent, a second folder's new time that a second folder of the one or more folders in the computer's filing system was last modified;
means for scanning media-file contents of the first folder if the new time and the old time of the first folder are not equivalent;
means for modifying, if the media-file contents of the first folder have changed, a media library based on the change; and,
means for comparing the second folder's new time with the old time for the second folder and then mark in the record that the second folder needs to be scanned if the second folder's new time and the old time of the second folder are not equivalent or does not need to be scanned if the second folder's new time and the old time of the second folder are equivalent.

* * * * *